US007765105B2

(12) United States Patent
Mo (10) Patent No.: US 7,765,105 B2
(45) Date of Patent: Jul. 27, 2010

(54) GRAPHICALLY REPRESENTING GOODS MANAGEMENT IN SUPPLY CHAIN

(75) Inventor: Brian S. Mo, Palo Alto, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1539 days.

(21) Appl. No.: 11/026,711

(22) Filed: Dec. 30, 2004

(65) Prior Publication Data

US 2006/0155554 A1 Jul. 13, 2006

(51) Int. Cl.
G06Q 10/00 (2006.01)
G06F 17/30 (2006.01)
G07G 1/00 (2006.01)

(52) U.S. Cl. .......................... 705/1.1; 705/10; 705/333; 705/341

(58) Field of Classification Search ...................... 705/1, 705/1.1, 7–11, 330, 333, 336–337, 341
See application file for complete search history.

(56) References Cited

U.S. PATENT DOCUMENTS

2005/0183143 A1* 8/2005 Anderholm et al. ........... 726/22

OTHER PUBLICATIONS

'RFID Technology and EPC in Retail.' White Paper [online]. Symbol Technologies, [retrieved on Dec. 29, 2004]. Retrieved from the Internet: <URL: www.symbol.com/products/whitepapers/RFID_and_EPC_in_Retail.html>.

'SAP Auto-ID Infrastructure (AII).' Datasheet [online]. SAP AG, [retrieved on Dec. 30, 2004]. Retrieved from the Internet: <URL: http://help.sap.com/saphelp_autoid21/helpdata/en/72/590041e9c5f06fe10000000a1550b0/content.htm>.

'Supply Chain Cockpit (SCC).' Datasheet [online]. SAP AG, [retrieved on Dec. 30, 2004]. Retrieved from the Internet: <URL: http://help.sap.com/saphelp_apo/helpdata/en/42/7f73374026023fe10000009b38f8cf/content.htm>.

* cited by examiner

*Primary Examiner*—John G Weiss
*Assistant Examiner*—Michael M Thompson
(74) *Attorney, Agent, or Firm*—Fish & Richardson P.C.

(57) ABSTRACT

A method of graphically representing management of goods in a supply chain includes receiving goods management data in a computer system from participants in a supply chain, the goods management data being sent upon the participants managing individual goods, and generating a graph in the computer system using the goods management data, the graph showing the management of the individual goods over time. A computer-implemented tool may generate a display area that shows the management of individual goods over time by the participants. The goods management may be graphically represented as cumulative curves. Curves may be shifted, cleansed or predicted. The tool may identify problems in the supply chain.

17 Claims, 9 Drawing Sheets

GRAPHICALLY REPRESENTING GOODS MANAGEMENT IN SUPPLY CHAIN

TECHNICAL FIELD

This description relates to graphically representing management of goods by participants in a supply chain.

BACKGROUND

Supply chains exist in many of today's business practices where goods or services are provided or used by several different participants. For example, a supply chain can be defined from a manufacturer of a product, through one or more intermediary actors or agents, and to a retail agent that sells the manufactured product. The intermediaries can include transport agents, distributors, wholesalers, and others.

A supply chain is often defined as a first step to better monitor the circumstances surrounding a company's business that relates to a distributed product. For example, a planning manager of a manufacturer needs access to information about the actors that participate in a supply chain for a given product. There exists systems for managing supply-chain information, for example those made by SAP AG in Walldorf (Baden) Germany. Moreover, the increasing use of radio-frequency identification (RFID) technology in all stages of the supply chain means that real-time data for tracking items becomes abundant.

However, existing supply-chain management systems may have disadvantages. For example, they may not provide a good visual representation of the supply chain in a graphical user interface (GUI) of the supply-chain management system. One consequence of this is that it may be difficult for the user to obtain a good overview of the supply chain. For example, the lack of an overview presentation may be significant for the planning manager. Also, existing systems may rely on information that is updated only once a day or less often, which means that there is no real-time view of developments in the supply chain.

SUMMARY

The invention relates to graphically representing goods management in a supply chain.

In a first general aspect, a method of graphically representing management of goods in a supply chain includes receiving goods management data in a computer system from participants in a supply chain, the goods management data being sent upon the participants managing individual goods. The method includes generating a graph in the computer system using the goods management data, the graph showing the management of the individual goods over time.

In selected embodiments, a future management of goods can be predicted and the graph can be updated to show the predicted future management.

In embodiments where the graph comprises at least first and second curves, the second curve can be laterally shifted toward the first curve until at least a portion thereof abuts the first curve. The shifting can be done by an optimizing module or by the user selecting and dragging the second curve.

In a second general aspect, a computer-implemented tool for graphically representing management of goods in a supply chain comprises a display area showing management of individual goods over time by participants in a supply chain, the display area being generated using goods management data that the participants send upon managing the individual goods.

Advantages of the systems and techniques described herein may include any or all of the following: Improving visual representation of a supply chain; providing a graphical overview of goods management performed by participants in the supply chain; providing a representation of a supply chain that makes use of abundant real-time item tracking data obtained using remotely detectable item labels; and providing visually supported tools for analyzing the supply-chain management.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
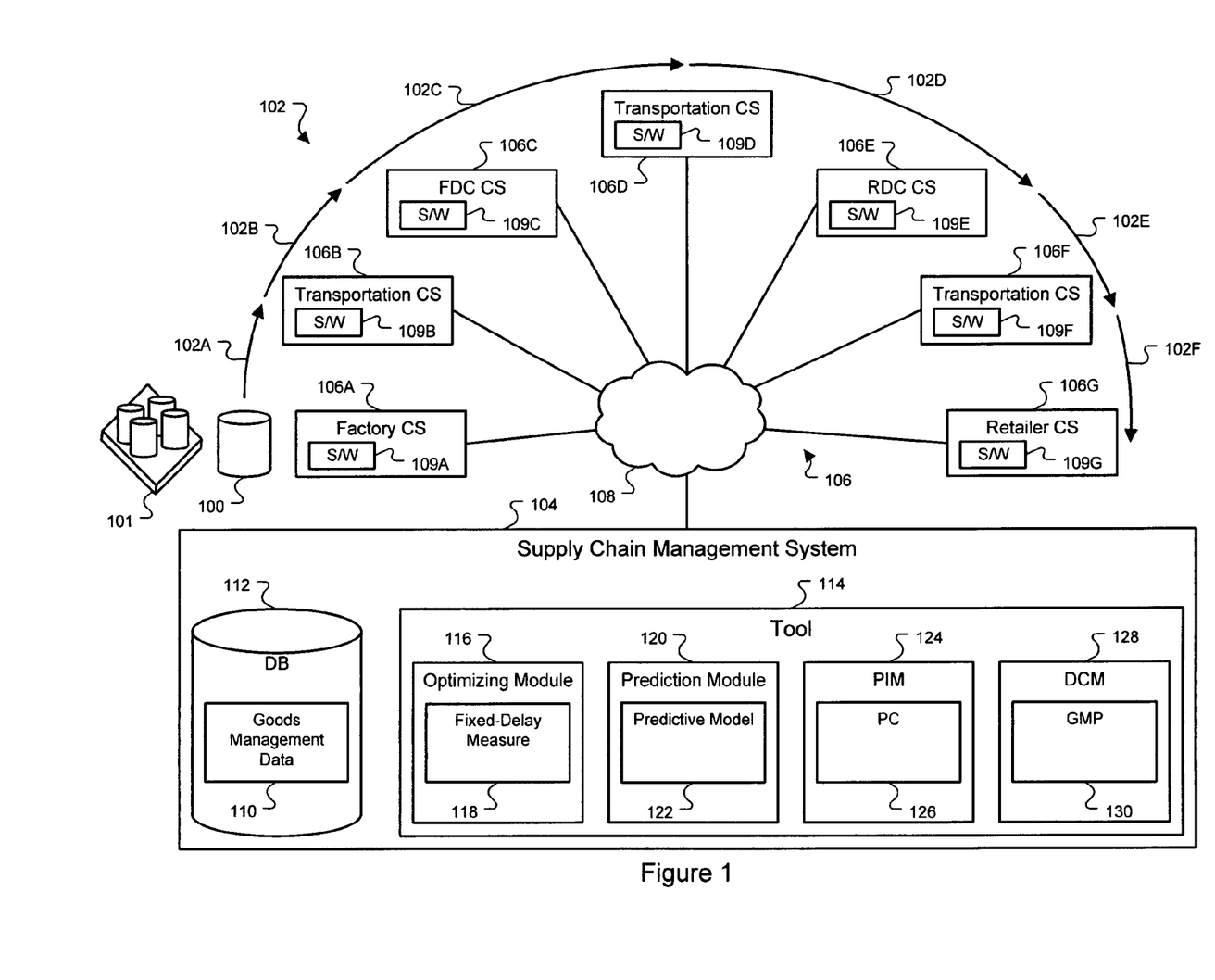
FIG. 1 is a block diagram conceptually illustrating goods management in a supply chain.

FIG. 1 shows a supply chain for one or more items. A factory is manufacturing the items and may deliver the individual items separately or in containers including multiple items. Here, an individual item 100 and a container 101 of multiple individual items are shown for illustration. In this example, after the individual item 100 is manufactured in the factory, it is distributed to a transportation agent as schematically illustrated by an arrow 102A. The transportation agent, in turn, may deliver the item to a factory distribution center (FDC) as schematically illustrated by an arrow 102B, where the item may remain for some time. Then, the factory distribution center releases the item to another transportation agent (arrow 102C) which delivers the item to a retailer distribution center (RDC) (arrow 102D). From the retailer distribution center the item may be delivered to another transporting agent (arrow 102E) and finally to a retailer (arrow 102F). Thus, the arrows 102A-F schematically represent a supply chain 102 in which participants manage the individual item 100 or the container 101, for example.

Some or all portions of the supply chain may involve parallel goods management by alternative participants. For example, there may be many retailers receiving goods from one retailer distribution center, and there may be several retailer distribution centers located in different regions.

A supply chain management system (SCMS) 104 may be used to monitor some or all aspects of the supply chain 102. For example, a planning manager in any portion of the supply chain from the manufacturing side to the retail side may benefit from overviewing the current status of the supply chain. The supply chain information may be used in evaluating the efficiency of the supply chain, in predicting the supply chain's future, and in identifying areas where the supply chain can be improved.

The SCMS 104 therefore gathers goods management data from participants in the supply chain 102. Particularly, each participant may use its own computer system in managing the individual goods: a factory computer system ("CS") 106A for the manufacturer; a first transportation computer system 106B for the first transporting agent; a factory distribution center computer system 106C for the FDC; a second transportation computer system 106D for the second transporting agent; a retailer distribution center computer system 106E for the RDC; a third transportation computer system 106F for the third transporting agent; and a retailer computer system 106G for the retailer. The computer systems 106 may connect to the SCMS 104 through any kind of network 108, such as the internet. The SCMS may be included in any of the computer systems 106: for example, it can be included in the factory computer system 106A to provide supply chain management for the item manufacturer. The SCMS may track management by some or all supply chain participants.

The supply-chain participants send their respective goods management data upon managing the individual goods. Particularly, the participants may obtain and transmit their data in real time. That is, for each participant there may be one or more predefined steps in the supply chain where the participant registers the identity of the individual goods. Accordingly, the participant may send the corresponding goods management data upon performing the predefined step(s). For example, the factory may send goods management data upon releasing the individual item to the first transporting agent; the second transporting agent may send goods management data upon delivering the individual item to the retailer distribution center, and so on. Accordingly, the goods management data may be sent upon transfer of responsibility for the goods from one participant to another.

Another example is that a participant sends goods management data upon performing a predefined step in its own management of the individual item. For example, if the first transporting agent receives a shipment including several items, it may send goods management data upon sorting the several items at its shipping facility. Thereafter, as another example, the transporting agent may again send goods management data upon placing the individual item on a vehicle for further transportation. Accordingly, goods management data may be sent upon an intermediate processing step.

The goods management data may reflect the particular procedure or step that is being, or has been, performed with regard to the individual goods. Also, the goods management data may include an identifier for the individual goods. For example, the predefined step may involve automatically reading (i.e., scanning) a label for the individual item. Such reading may involve a known process such as optical character recognition technology, bar code scanning technology or RFID technology. Accordingly, the goods management data may contain the information that a predefined process step has been performed for a item bearing a specified RFID label.

The RFID label may be used to uniquely identify the labeled item from any other item in the world. For example, the RFID technology may use the code standard known as electronic product code (EPC). Supply-chain participants may use unique global EPC identifiers to identify and track all tagged items.

The computer systems 106 may include software that when executed triggers each of the computer systems to send its goods management data to the SCMS. Particularly, the factory computer system 106A may include software ("S/W") 109A, the first transportation computer system 106B software 109B, the factory computer system 106C software 109C, and so on. The software 109A-G may be different programs or may all be versions of the same software program.

The SCMS 104 receives the data sent from the participants and stores goods management data 110 in a database (DB) 112. If the individual computer systems 106 have sufficient processing capacity and there is enough bandwidth for the transmissions in the network 108, the SCMS can achieve what is essentially a real-time monitoring of the supply chain. The SCMS analyzes all of the data and may selectively display or present portions thereof. Over time, a large volume of goods management data can be accumulated in the database and this data can be processed to obtain information about the goods management, as will now be described.

The SCMS 104 includes a tool 114 that can be used with the goods management data. The tool is computer-implemented and is configured to graphically represent the goods management, to name one example. Particularly, the tool can generate a GUI for graphically represent management of goods in the supply chain 102.

Figure 2A:
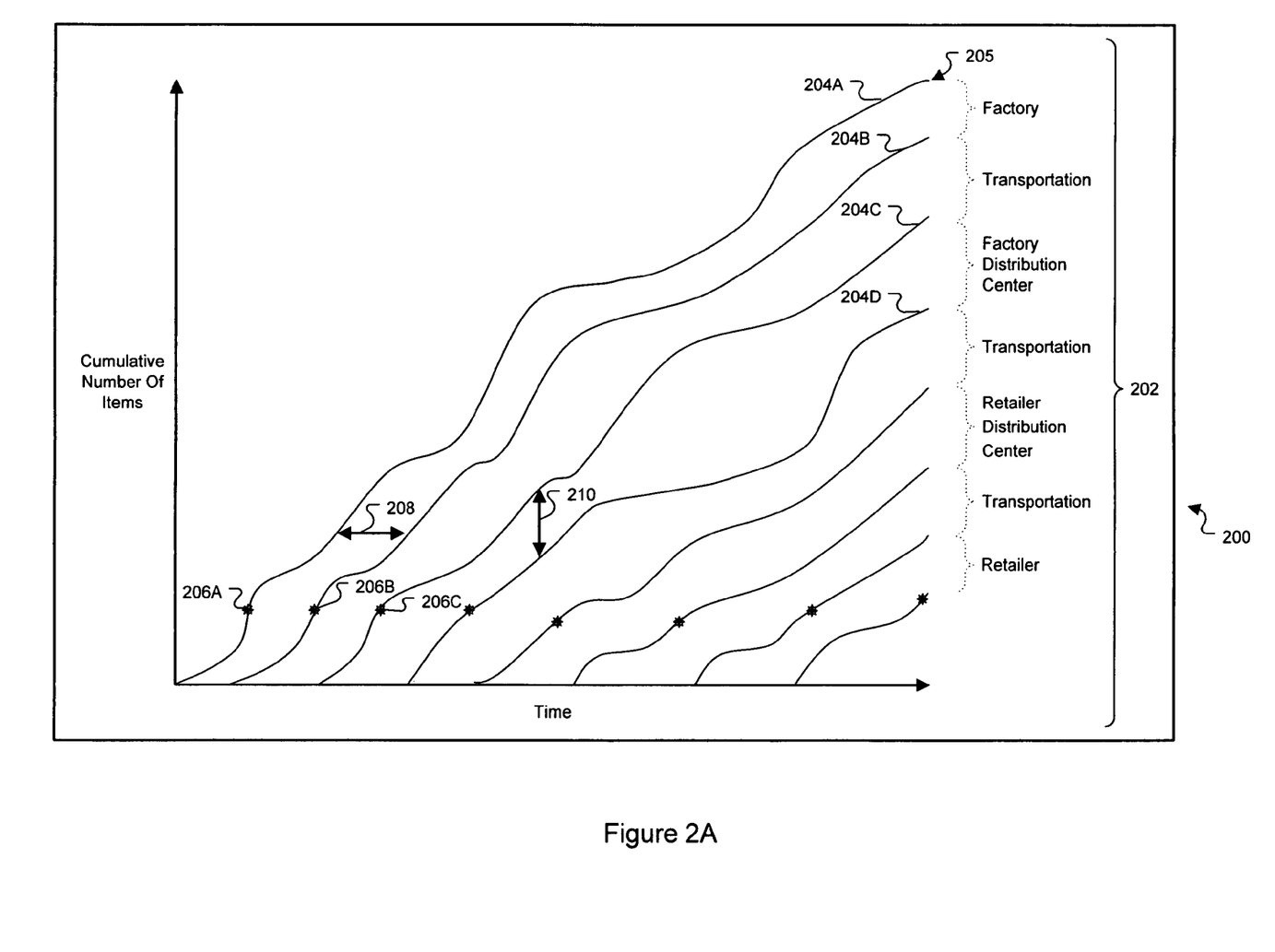
FIGS. 2A-B are examples of a GUI that a supply-chain management system shown in FIG. 1 can generate.

FIG. 2A shows an example of a GUI 200 that the tool 114 can generate. The GUI includes a display area 202 that currently contains a graph. A vertical axis of the graph is labeled "Cumulative number of items" and a horizontal axis is labeled "Time". The graph shows the management of the individual goods by the different participants over time.

Here, the graph includes several curves representing the cumulative numbers of goods managed by the respective participants. For example, a first curve 204A may represent goods management in a factory, such as the completion of individual items. That is, data may be added to the curve 204A every time the factory finishes an individual item (or a container of several individual items). The data is added at its specific point in time, measured against the Time axis. In the current state of the GUI 200, new data is added at the point 205. Because the graph is cumulative, the data is added to the already existing data for that curve. Accordingly, the curves cannot decrease over time, only grow upward (if additional goods are managed) or remain horizontal (if no additional goods are managed).

A second curve 204B may represent transfer of the item to the first transportation agent, a third curve 204C delivery of the item to the FDC, a fourth curve 204D placement of the item in the vehicle of the second transportation agent, and so on. Accordingly, the graph may include at least one curve for every (monitored) participant in the supply chain.

It may be possible to track an individual item in the graph. For example, data 206A for an arbitrary item has been highlighted as an illustration. The data 206A corresponds to the production of that specific item in the factory. For example, a unique serial number was applied to the item at the end of the manufacturing line, and the data 206A is generated upon that serial number being scanned into the factory computer system 106A. Data 206B, in turn, is generated upon the first transportation agent picking up the specific item, and data point 206C is generated upon the transporting agent delivering the specific item to the factory distribution center. Additional data points are highlighted in the graph to show the subsequent management of the item in the supply chain. If the supply-chain participants operate according to a first-in first-out (FIFO) principle, the data points for an individual item will be horizontally aligned in the graph. If not, the data points may deviate from a horizontal line, for example if later-produced goods are transported sooner than earlier-produced goods. The tool may be able to delete or rearrange goods in the graph to eliminate such effects, as will be described later.

The horizontal distance between the curves indicates the time that it takes one or more participants to manage the individual goods. That is, a distance 208 between the curves 204A and 204B is a measure of the time it took for that particular item, at that point in time, from item manufacture until transportation pick-up. As another example, the distance may measure the time it takes from when a distribution center receives an individual item until it forwards it to a transporter.

The vertical distance between the curves, in turn, indicates the amount of inventory held by one or more of the participants. That is, a distance 210 between the curves 206C and 206D is a measure of how many items the factory distribution center has received by not yet handed off to transportation; i.e., its current inventory at that point in time. As another example, the distance may measure the volume of items that a transporting agent has received but not yet delivered.

The display area cumulates information as new goods management data is received from the participants. The curves 204A, 204B, and so on, may therefore continuously grow upward in the graph over time. The display area 202 may be re-centered to show the most recent portions of the curves, for example so that the Time axis runs from about a year ago (at the origin) to the present.

Figure 2B:
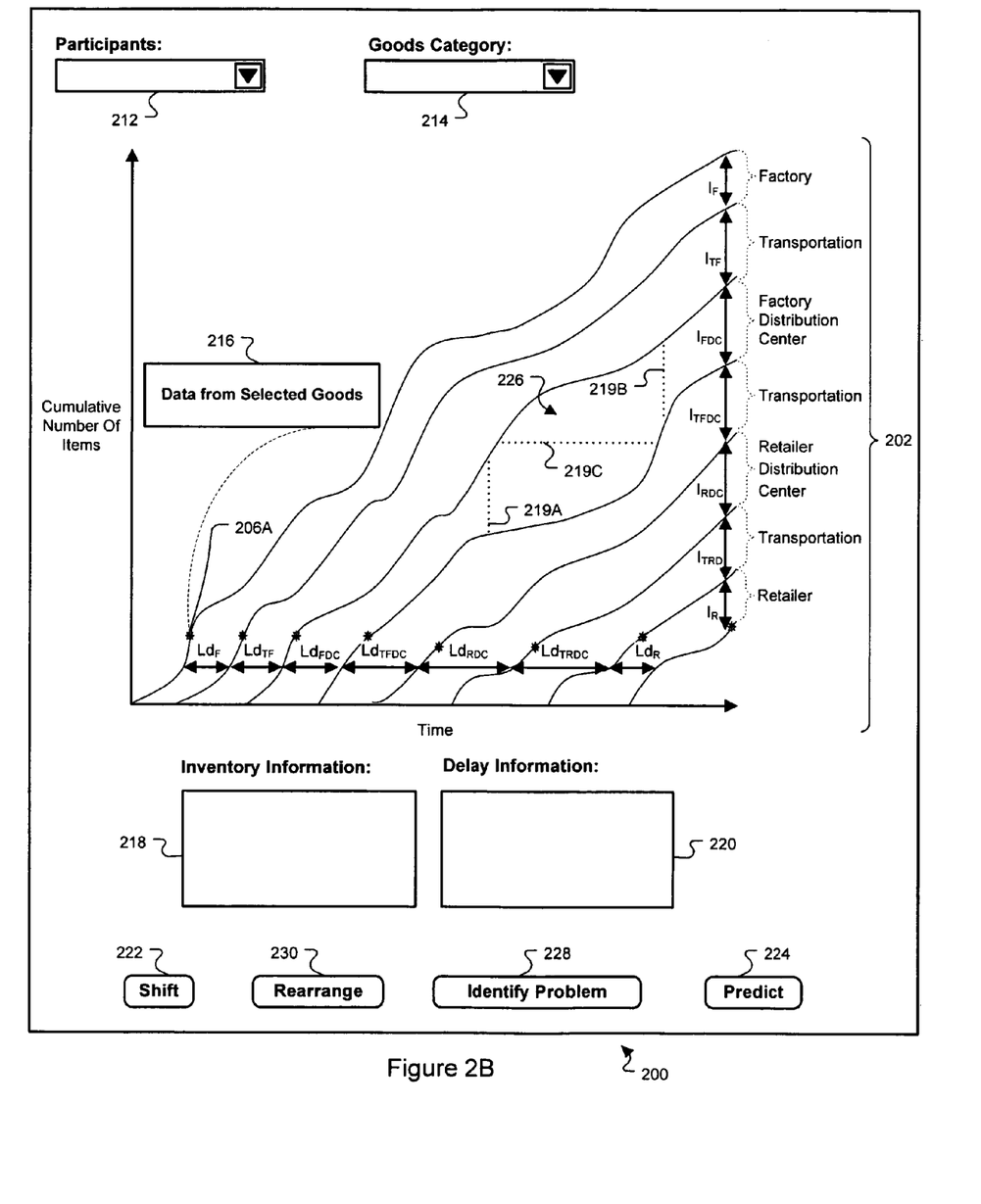

FIG. 2B shows another example of the GUI 200 that includes the display area 202 and some additional features. The GUI 200 here includes a first input control 212 for the user to select the supply-chain participants whose goods-management data are to be displayed in the area 202. That is, goods-management data from several participants may be continuously received and stored in the database 112, and the control 212 lets the user select the participants whose curves are to be displayed in the GUI. The control 212 may include a drop-down list box or any other kind of input control.

The GUI 200 here includes a second input control 214 for the user to select one or more categories of individual goods whose data is to be displayed in the area 202. That is, goods-management data may be available for each individual item or for units of several items. For example, the control 214 may let the user select whether the item 100 or the container 101 should be illustrated in the graph. The control 214 may include a drop-down list box or any other kind of input control.

The GUI 200 may output a portion of the goods-management data that relates to an individual item (or an individual container). Particularly, the user may select any data point on a curve with a pointing device to receive this information. For example, upon the user selecting the data 206A, a data area 216 may display the data that the SCMS received upon the item being produced in the factory. This lets the user focus in on the details of the displayed curves and find out more specifics of the goods-management data.

The GUI 200 may output inventory or delay information. For example, an inventory information area 218 can specify the volume of items that is in inventory at a specified time. That is, the user may specify a specific inventory distance pertaining to a participant, such as a distance 219A or 219B. The tool will then output a measure of the inventory at that time. This can help the user determine how much inventory is held by different supply-chain participants at any given time.

As another example, a delay information area 220 can specify the time it took from one participant's management of a specific item to another. That is, a distance 219C may indicate the delay from when the FDC received the item until it sent the item off for shipping. The user can select the distance 219C to obtain a measure of this delay. This can help the user identify causes of delays in the supply chain.

Figure 3A:
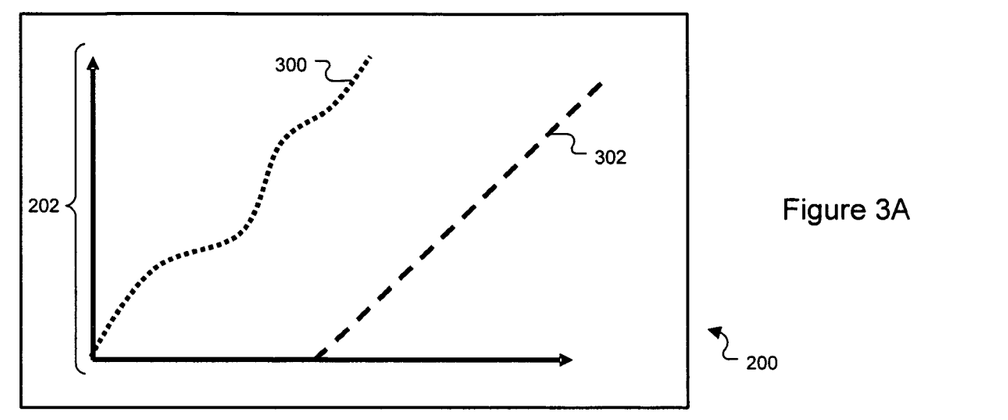
FIGS. 3A-C, 4A-B and 5 are other examples of the GUI that can be generated.
Figure 3B:
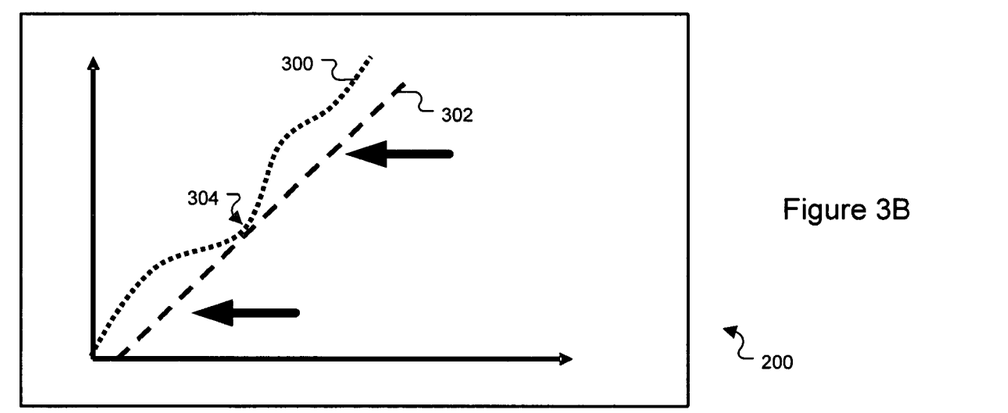
Figure 3C:
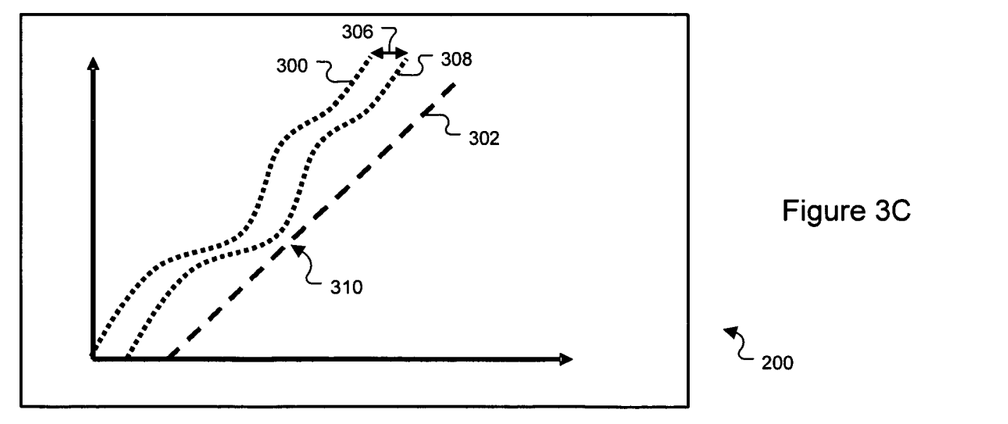

The tool 114 may be used in attempting to optimize the supply chain 102. Particularly, the GUI 200 can provide shifting of individual curves to illustrate the consequences of changes that can be made in the supply chain. FIGS. 3A-C show the GUI 200 in a simplified form for purposes of illustration. Here, the graph includes curves 300 and 302 which may relate to arbitrary goods-manufacturing procedures in the supply chain, for example a transporter's receipt (curve 300) and subsequent delivery (curve 302) of the individual goods. Accordingly, the horizontal distance between the curves 300 and 302 is a measure of the delay that the transporter contributes to the supply chain.

The GUI can include a third input control 222 (see FIG. 2B) by which the user can initiate horizontal shifting of the second curve 302 toward the first curve 300. The tool 114 may include an optimizing module 116 (see FIG. 1) that handles the user-initiated shifting. FIG. 3B shows the curve 302 being shifted horizontally to the left, toward the curve 300. The shifted curve illustrates how the graph would change if the current participant were to cause a smaller delay than presently; that is, if the participant were more efficient. The GUI 200 can present information about the delay as it decreases due to the shifting, for example in the area 218.

The optimizing module 116 ceases the shifting upon the second curve abutting the first curve. Here, the shifting ceases when the curves intersect at a point 304, corresponding to an instance of zero delay and zero inventory for the specific participant. Because the curves 300 and 302 have different shapes, other points thereon (corresponding to other individual goods) do not overlap when the shifting ceases. The GUI 200 may output information about the supply-chain state that results: for example, the total delay that has been eliminated.

Now that the user has obtained a measure of how much delay that can (theoretically) be eliminated for this particular participant, the user may initiate changes in the supply chain 102 to accomplish this goal. For example, the transporting agent can be replaced with another transporter that is more efficient. Over time, the GUI 200 will reveal whether these practical measures actually reduce the delay. As has been suggested above, it is unlikely that all relay is avoidable; rather, the delay most likely consists of some unavoidable and some avoidable delay. In other words, some delay is fixed (unavoidable) and the remained of the delay is variable (avoidable) depending on the particular participant.

Upon seeing the results of using the new transporting agent, the user may decide that a fixed-delay time 306 between the curves cannot be avoided. The user can input this value into the SCMS as a fixed-delay measure 118, and the tool thereafter can generate the GUI 200 as shown in FIG. 3C, wherein a new curve 308 represents the fixed-delay measure 118. Upon reviewing the GUI 200, the user can see that the participant is causing a certain delay (the distance between the curves 300 and 302). However, the curve 308 indicates how much of the delay is unavoidable which helps the user better analyze the status of the supply chain. For example, the curve 308 can help the user recognize that the participant sometimes, such as at a point 310, accomplishes a high efficiency and that there may not be any significant avoidable delay at that point in time.

As another example, the user can shift the curves using click and drag technology. That is, the GUI can be configured so that the user can select a curve and drag it in any direction to simulate a change in the goods management. For example, the user can drag the curve until any portion thereof abuts another curve in the GUI. The GUI may display inventory or delay information that is based on the new curve position.

Figure 4A:
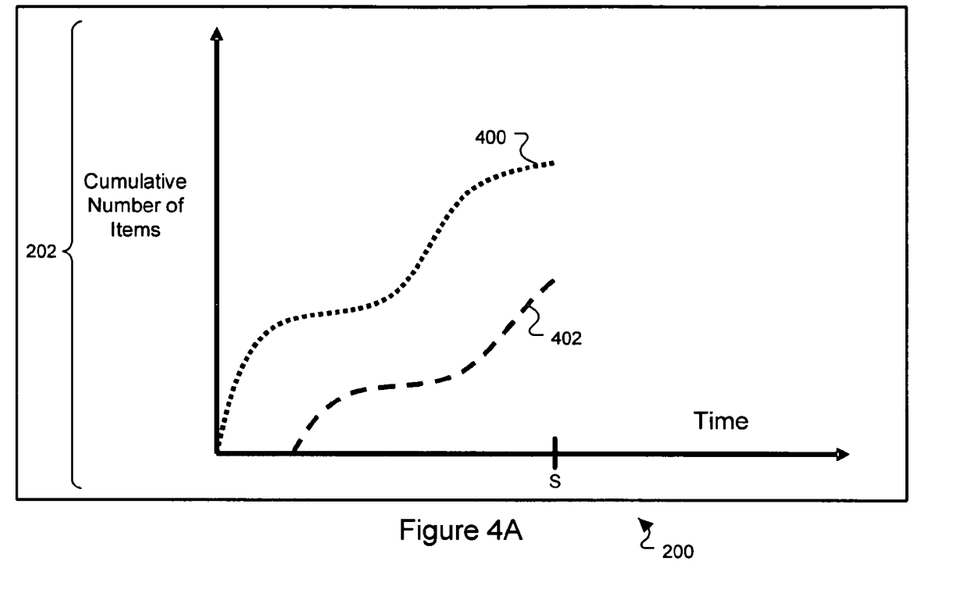
Figure 4B:
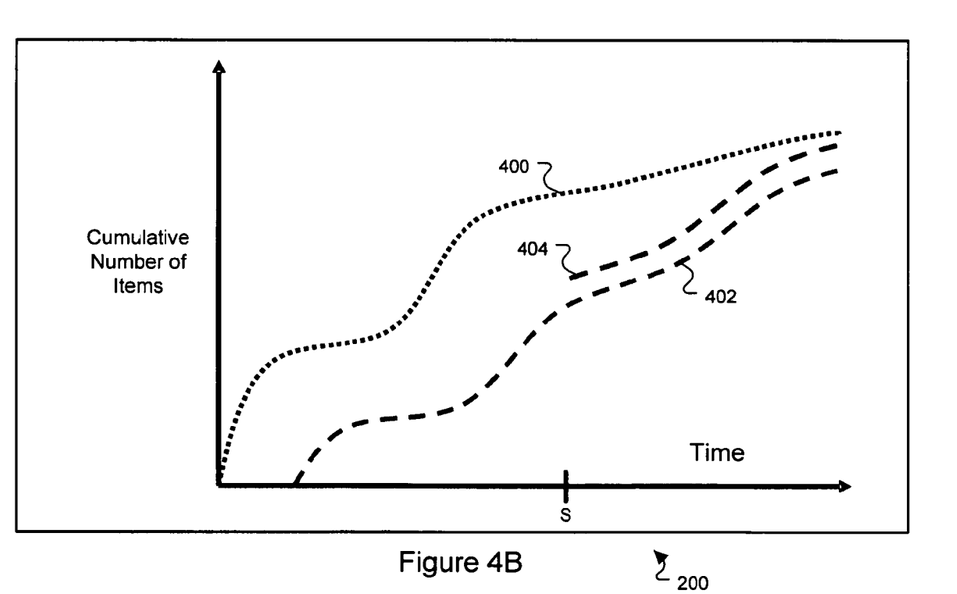

A participant may send goods management data more than once for every managed individual item. For example, the distribution center may first scan the item upon sorting, and thereafter scan the item upon handing it over to a transporter. Increasing the number of reporting steps for a single participant may be considered a "subdivide operation". FIGS. 4A and 4B show examples of the GUI 200 that involve receiving a subdivide command from a participant.

FIG. 4A illustrates the graph before the subdivision. Exemplary curves 400 and 402 are currently displayed. The curves may come from a single participant or from two participants. The curve 402 is "later" in time than the curve 400. Assume that the participant to which the curve 402 relates decides to begin tracking the item also at an intermediate stage of its processing. For example, the participant installs an additional scanner in its management process and decides to provide also data from this tracking point to the SCMS. As another example, the participant computer system may already be tracking the individual goods at more than one process point, but is currently sharing only the data corresponding to curve 402 with the SCMS. Providing additional goods-management data to the tool 114 may improve its analysis of the supply chain and may improve the ability to diagnose and overcome problems.

The participant computer system may therefore send a subdivide command to the SCMS to indicate that the participant is now also sending additional goods management data to the SCMS. Here, the subdivide command is received at a time S, indicated in the graph for illustration. Upon receiving the subdivide command, the SCMS begins storing also the received additional data in the database 112. The additional data is to be displayed as an additional curve in the graph, for example as shown in FIG. 4B. An additional curve 404 is shown in the graph from the time S and forward. If the participant system provides also historical data for the subdivided processing stage, the curve 404 may originate before the point S in time, as far back as the historical data is made available. Any or all of the software 109A-G on the participant systems may generate subdivide commands, for example upon a user request.

The SCMS may include a prediction module 120 that can make predictions based on the goods management data 110. For example, the prediction module may use a predictive model 122 that takes into account the historical information for one or more participants and predicts the status of the supply chain at a future time. Such predictions can help a user foresee, or estimate the onset of, unwanted future events.

Figure 5:
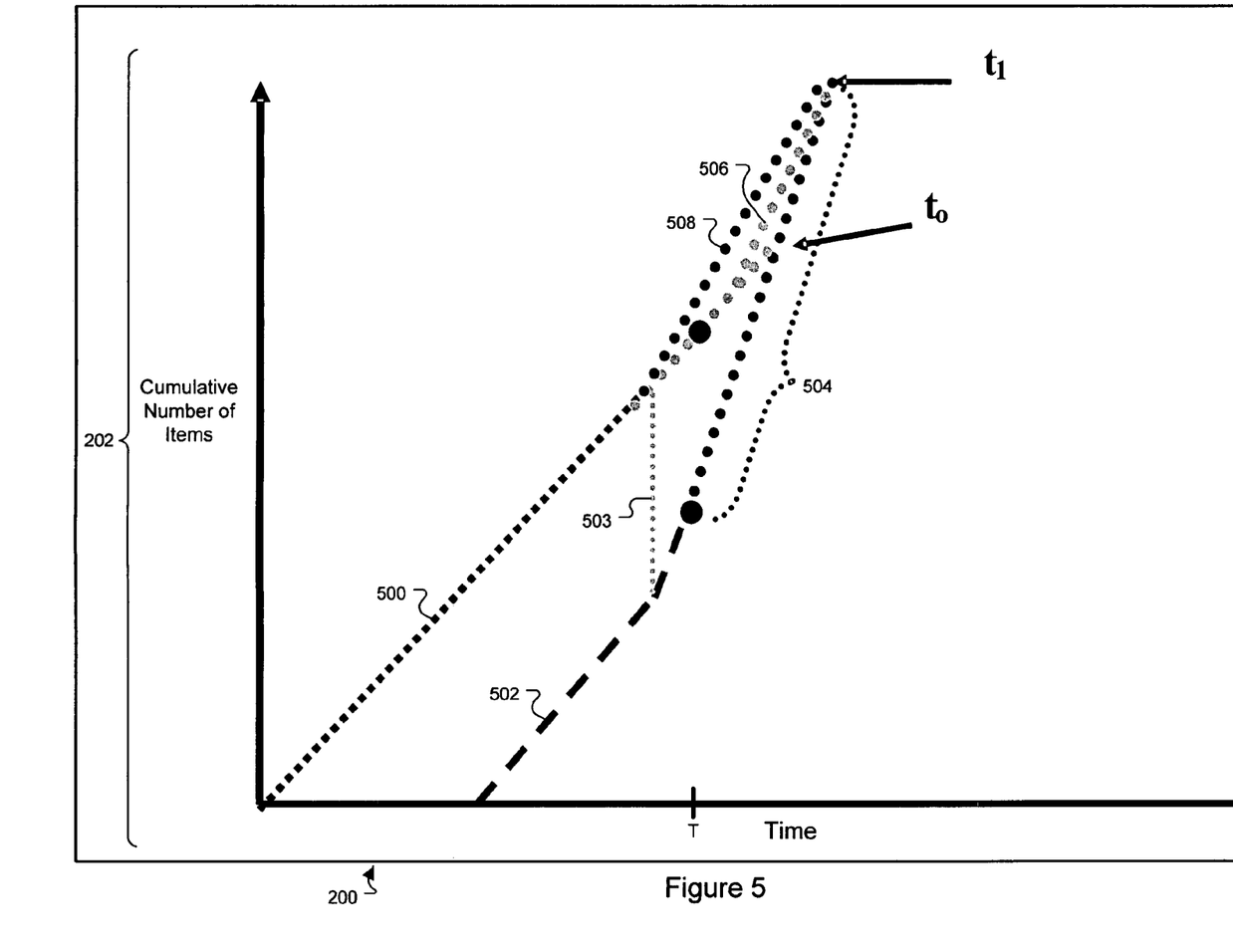

An exemplary prediction will now be described with reference to FIG. 5, which shows the GUI at an arbitrary time T indicated on the Time axis for illustration. The graph currently shows curves 500 and 502. In this example, it is assumed that the curve 500 corresponds to the cumulative "supply" of individual items over time at an arbitrary point in the supply chain. Similarly, curve 502 corresponds to the cumulative "demand" for the individual items over time at that point. For example, the curves 500 and 502 may indicate the respective cumulative numbers of goods being placed in, and removed from, a warehouse.

From the origin of the graph and until just before the time T, the curves 500 and 502 are essentially parallel. This means that the rates of goods supply and demand are equal, and that an inventory 503 does not change significantly over time. The curve 502 thereafter tilts upward, reflecting a sudden increase in the demand rate. This development can be a problem for the owner of the warehouse, who typically wants to maintain a certain balance between supply and demand. In other words, there should never be too much inventory and the warehouse should never run out of goods.

The prediction module 120 may therefore be used to predict the future development of the curve 502 so that the warehouse owner can adjust the supply (curve 500) accordingly by notifying its supplier to provide, or the manufacturer to produce, more items. The user can initiate the prediction using a fourth input control 224 in the GUI 200 (see FIG. 2B) Here, the graph is updated with a demand-curve extension 504 predicted by the prediction module 120.

The GUI 200 shows that if the curve 500 is not changed—that is, if the rate of supply remains constant—the curves 500 and 502 will intersect at a future time $t_0$. However, if the rate of supply increases as indicated by a supply curve extension 506, the point in time at which the warehouse runs empty can be pushed further into the future, to a time $t_1$. Moreover, a supply curve extension 508 can also be shown. The curve 508 indicates that if countermeasures had been taken earlier, for example as soon as the increased demand became evident, it would have been sufficient to increase the supply rate by a lesser amount (the extension 508 has less slope than the extension 506). Similarly, with an earlier reaction to the increased demand, the point at which the warehouse runs out of items may be pushed further into the future.

Here, the demand-curve extension 504 is linear, which may be considered a first-order prediction. In other implementations, the predictive model 122 may be configured to provide predictions of any order, such as second-order or third-order predictions, which may provide more complex curve extensions. The better predictions may be obtained using existing prediction technology, such as that used in the Advanced Planner and Optimizer available from SAP AG in Walldorf (Baden), Germany.

The tool 114 can be configured to help the user identify problems in the supply chain. For example, the tool may use a problem-identifying module (PIM) 124 to analyze the received goods-management data. With reference again to FIG. 2B, the PIM 124 can look for graph areas that correspond to "bottlenecks" in the supply chain. For example, too much delay in managing the goods may indicate a bottleneck. Another example is too much inventory at a given time. Here, the PIM 124 identifies an area 226 (see FIG. 2B) as being a potential bottleneck, and the user can thereafter investigate its possible causes.

Supply chain problems may be identified with the use of predefined criteria. The PIM 124 may include at least one predefined criterion (PC) 126. The predefined criterion may relate to the amount of inventory or to the amount of delay, to name two examples. It is seen that the bottleneck area 226 is relatively large compared to other features in the graph. Accordingly, the bottleneck area 226 may be identified by using the inventory measures 219A and B, by using the delay measure 219C, or by using a combination thereof. The predefined criterion may evaluate relative changes in respective measure by comparing with their earlier values. The user can initiate the PIM 124 with a fifth input control 228 in the GUI 200.

Figure 8A:
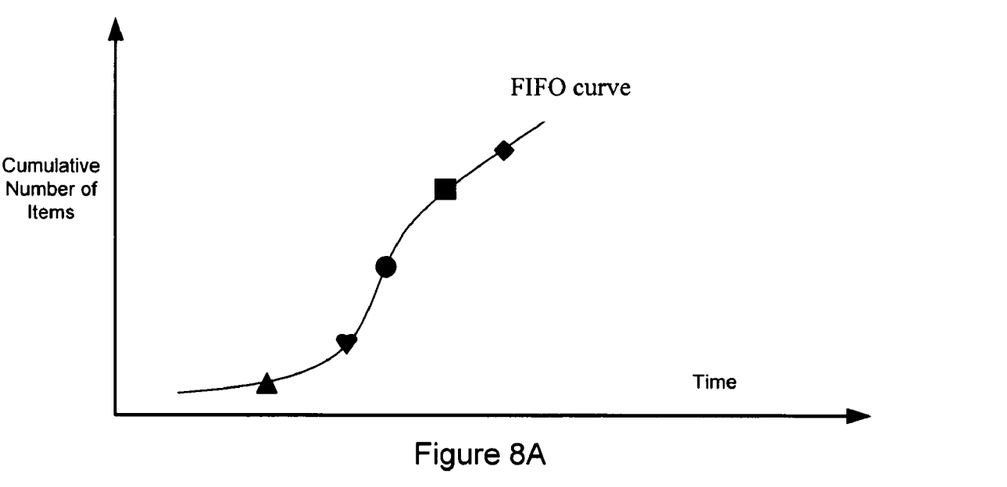
FIGS. 8A-B are other examples of the GUI that can be generated.
Figure 8B:
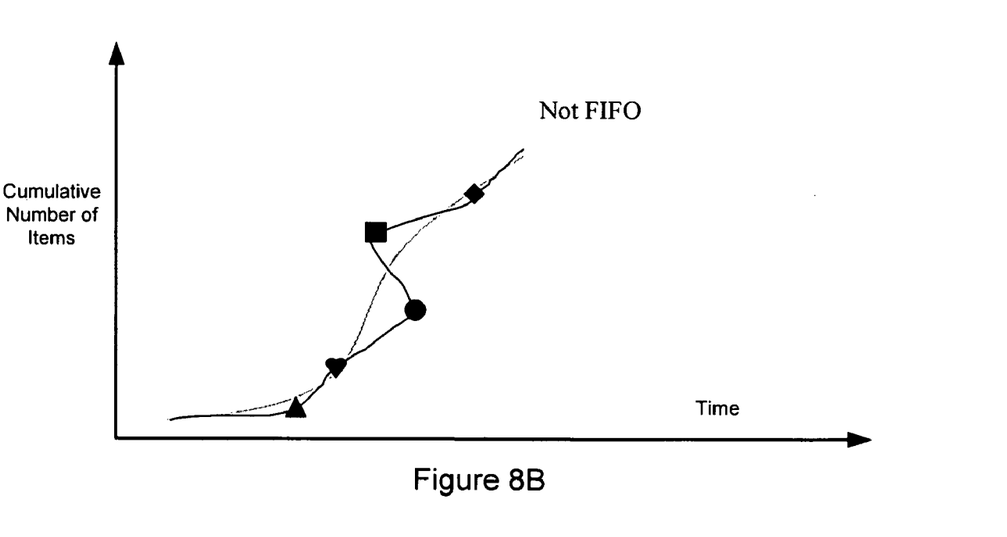

The tool 114 here includes a data cleansing module (DCM) 128 that can be used to correct irregularities in the display area 202. If one or more of the participants manage goods contrary to a goods management procedure (GMP) 130, this may cause the display area 202 to show data that is "messy" or otherwise difficult to understand. For example, ignoring the FIFO procedure may cause some or all of the curves 202 to have irregularities such as scattered data points or discontinuities. This effect may be more pronounced in a graph that has a smaller time scale. A graph with a larger time scale, in contrast, may nevertheless appear smooth because there are more data points in the same area. The DCM can be used to cleanse such data by rearranging or deleting it. An example is shown in FIGS. 8A and 8B that include a FIFO curve and a non-FIFO curve, respectively. For clarity, each item in the curves is represented by a different shape: triangle, heart, circle, square and diamond. In FIG. 8A, the goods are managed in the order just mentioned, and because this is a FIFO curve, this order of management is the same order in which the items were received. Contrary to the FIFO principle, FIG. 8B shows the "square" item being managed earlier in time than the "circle" item despite the square being a later-received item. The non-FIFO curve is less smooth than the FIFO curve. To improve this situation, the DCM can delete or rearrange one or more aberrant data points. Here, the DCM deletes the circle item or the square item, or both. If the curve contains significant data in accordance with the FIFO principle, the removal of a small amount of aberrant data has no significant impact.

The fact that goods were managed contrary to the procedure 130 (e.g., new goods shipped before old) may be relevant information if it affects the quality of the shipped goods. In other situations, however, it may be less relevant. This may be the case if the user of the GUI 200 is mainly interested in getting an overview of the overall status of the supply chain and is not particularly concerned with the order that goods are shipped (perhaps because the goods are all identical and have a significant shelf life).

The user may therefore select a sixth input control 230 in the GUI 200 to trigger the DCM 128 to rearrange or delete at least some of the goods-management data in the display area 202. For example, the DCM can relocate the data for selected items to make the curves 206 smoother and easier to read. As another example, the GUI 200 may let the user manually relocate goods-management data using a pointing device. The DCM 128 may be used with other goods management procedures than a FIFO procedure.

Figure 6:
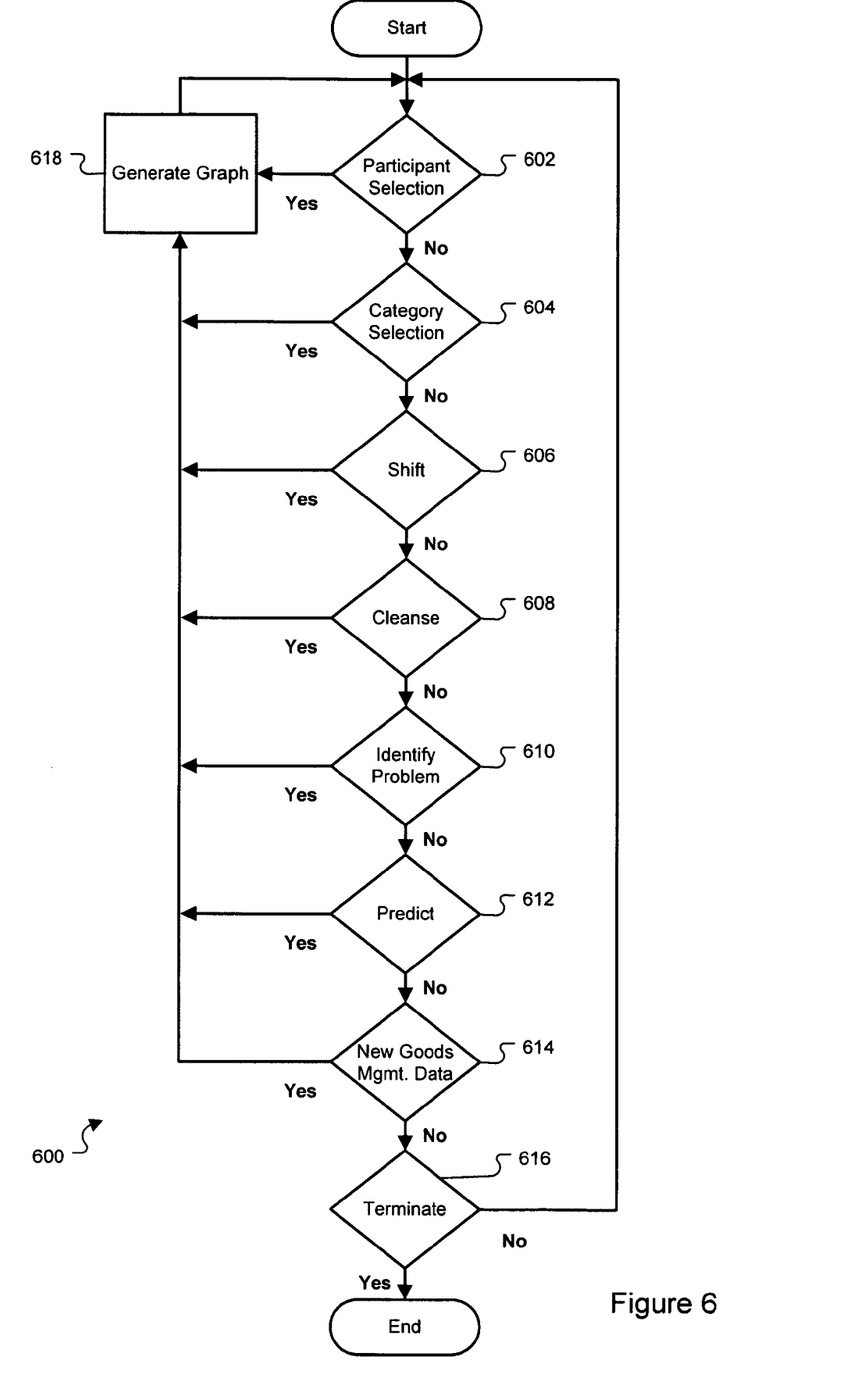
FIG. 6 is a flow chart of a procedure that can be performed in the supply-chain management system shown in FIG. 1.

FIG. 6 is a flow chart of a method 600 that relates to graphically representing management of goods in a supply chain. The method 600 may be performed in the SCMS 104. For example, a computer program product may include instructions that cause a processor to perform operations comprising the steps of the method 600. Particularly, the method 600 may be performed when the tool 114 is displaying the GUI 200 that includes the display area 202. The method 600 includes the following steps:

Determining, in step 602, whether the user has selected a particular participant for inclusion in the display area. For example, the user can select one or more participants with the first input control 212. Exemplary participants include manufacturers, transporting agents, distribution centers and retailers.

If no new participant has been selected in step 602, the method comprises determining, in step 604, whether the user has selected a category for the individual goods in the display area. For example, the user can select a category using the second input control 214. Exemplary categories include individual goods and containers of several individual goods.

If no new category has been selected in step 604, the method comprises determining, in step 606, whether the user has requested shifting of a displayed curve. For example, the user may request shifting using the third input control 222. Examples of shifting include laterally shifting the curve 302 until it abuts the curve 300 as shown in FIG. 3B.

If shifting has not been requested in step 606, the method comprises determining, in step 608, whether the user has requested cleansing of goods management data. For example, the user may request cleansing using the sixth input control 230. Examples of cleansing include relocating at least some goods-management data according to a goods-management procedure.

If no cleansing has been requested in step 608, the method comprises determining, in step 610, whether the user has requested identification of any possible problem in the supply chain. For example, the user may request problem identification using the fifth input control 228. Identifying problems may involve evaluating whether maximum allowable vertical or horizontal distances between the curves are exceeded.

If no problem identification has been requested in step 610, the method comprises determining, in step 612, whether the user has requested prediction of a future management of individual goods. For example, the user may request prediction using the fourth input control 224. Examples of predictions include a first-order linear extension of a curve 502 as shown in FIG. 5.

If no prediction has been requested in step 612, the method comprises determining, in step 614, whether new goods management data has been received. If no new data has been received, the method comprises determining, in step 616, whether the method 600 is to be terminated. If the method is not to be terminated, it is performed again starting with step 602.

If the determination in any of the steps 602-614 results in a "yes", the method comprises generating the graph in step 618. Generating the graph includes displaying the GUI 200 as in any or all of the examples shown or described herein. Step 618 also includes updating the graph when appropriate, for example upon the user changing the participant selection (step 602), shifting a curve (step 606), or cleansing data (step 608). Receipt of a subdivide command from one or more participants also causes step 614 to result in a yes. Accordingly, the graph is generated (updated) upon any or all of these events.

Figure 7:
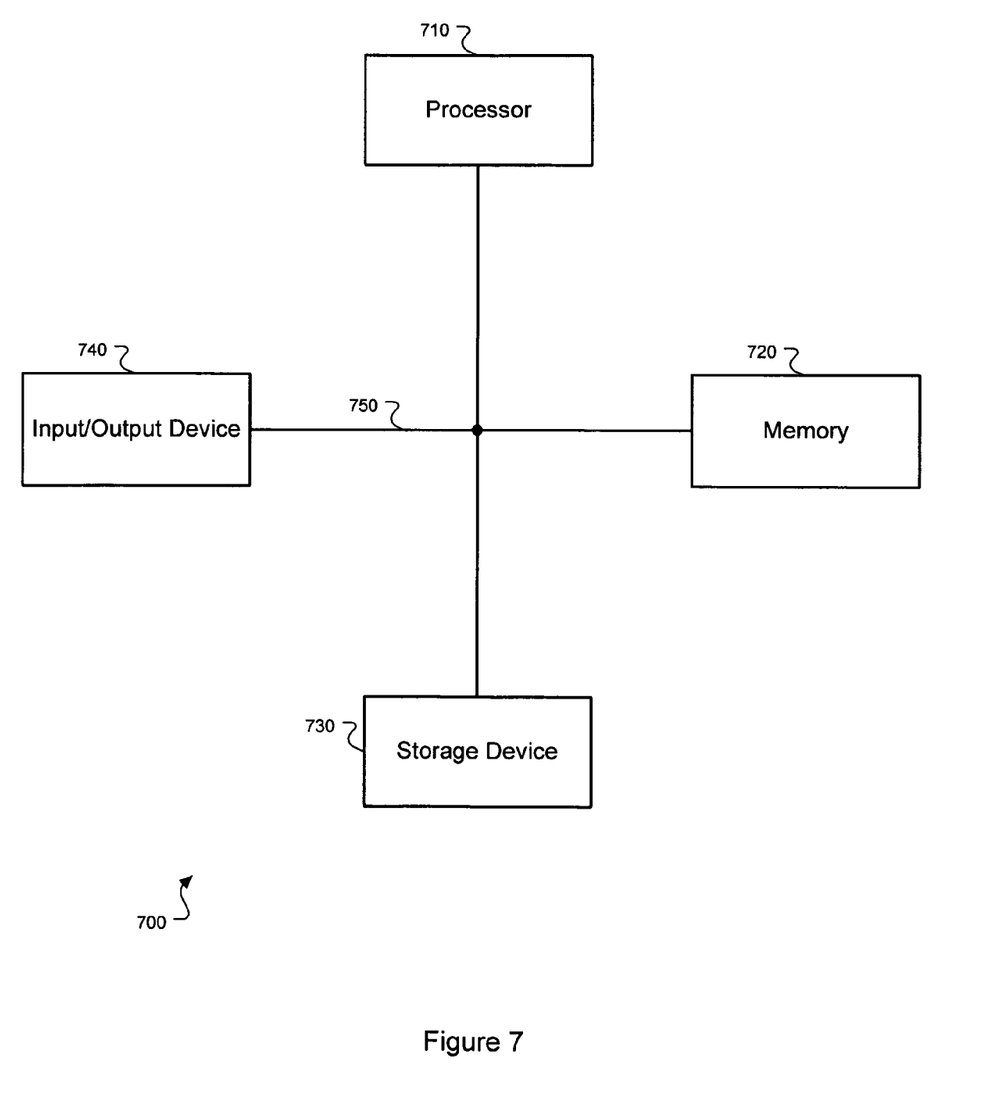
FIG. 7 is a block diagram of a general computer system.

FIG. 7 is a block diagram of a computer system 700 that can be used in the operations described above, according to one embodiment. For example, the system 100 can be included in the SCMS 104 and in any or all of the participant computer systems 106.

The system 700 includes a processor 710, a memory 720, a storage device 730 and an input/output device 740. Each of the components 710, 720, 730 and 740 are interconnected using a system bus 750. The processor 710 is capable of processing instructions for execution within the system 700. In one embodiment, the processor 710 is a single-threaded processor. In another embodiment, the processor 710 is a multi-threaded processor. The processor 710 is capable of processing instructions stored in the memory 720 or on the storage device 730 to display graphical information for a user interface on the input/output device 740.

The memory 720 stores information within the system 700. In one embodiment, the memory 720 is a computer-readable medium. In one embodiment, the memory 720 is a volatile memory unit. In another embodiment, the memory 720 is a non-volatile memory unit.

The storage device 730 is capable of providing mass storage for the system 700. In one embodiment, the storage device 730 is a computer-readable medium. In various different embodiments, the storage device 730 may be a floppy disk device, a hard disk device, an optical disk device, or a tape device.

The input/output device 740 provides input/output operations for the system 700. In one embodiment, the input/output device 740 includes a keyboard and/or pointing device. In one embodiment, the input/output device 740 includes a display unit for displaying graphical user interfaces. For example, the input/output device 740 can generate any or all examples of the GUI 200 shown or described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of graphically representing management of goods in a supply chain, the method comprising:

receiving goods management data in a computer system through a network from computer systems of participants in a supply chain, the goods management data being sent by the computer systems upon the participants managing individual goods at multiple points in time, the cumulative number being added up to and including each of the points in time;

storing the received goods management data in a database;

adding the stored goods management data together to determine a cumulative number of the individual goods for each of the participants at each of the points in time;

generating a graph in the computer system using the cumulative numbers of the individual goods, the graph including multiple curves, each of the curves showing the management of the individual goods over time by one of the participants and each of the curves including multiple data points, each of the data points representing one of the cumulative numbers of the individual goods at one of the points in time;

while displaying the generated graph to a user, receiving a selection from the user of a data point among the data points in the generated graph; and in response to receiving the selection, shifting a first curve of the graph relative to a second curve of the graph to determine a distance between the first curve and the second curve, the shifting ceasing upon a point of the first curve intersecting a point of the second curve, the distance corresponding to the delay time that is attributable to a participant, and the delay time usable to improve an efficiency of the supply chain.

2. The method of claim 1, wherein the participants send the goods management data upon performing a predefined step in the management of the individual goods.

3. The method of claim 1, further comprising using the goods management data to predict a future management of goods by the participants in the supply chain and updating the graph to show the predicted future management.

4. The method of claim 1, further comprising receiving a subdivide command from a first participant among the participants, the subdivide command indicating that the first participant is also sending additional goods management data to the computer system, the additional goods management data to be displayed as an additional curve in the graph.

5. The method of claim 1, further comprising receiving and updating the graph to include a third curve intermediate the first curve and the second curve and corresponding to a fixed-delay measure input by a user, the fixed-delay measure having been determined based on the delay time and corresponding to a portion of the delay measure that is unavoidable.

6. The method of claim 1, further comprising identifying to a user a portion of the graph that meets a predefined criterion for supply chain problems.

7. The method of claim 6, wherein the predefined criterion is one selected from the group consisting of: a maximum distance between at least two of the curves at a specific time, a maximum distance between at least two of the curves for at least one of the individual goods, and combinations thereof.

8. The method of claim 1, further comprising rearranging or deleting in the graph at least one of the individual goods that at least one of the participants managed contrary to a goods-management procedure.

9. A computer-implemented tool for graphically representing management of goods in a supply chain, the computer-implemented tool including instructions stored in a computer-readable medium that, when executed, cause a processor to perform operations to display a graphical user interface on a display device comprising:
   a display area showing management of individual goods over time by participants in a supply chain, the display area being generated using goods management data that computer systems of the participants send upon the participants managing the individual goods at multiple points in time, the display area including:
      a graph of cumulative numbers of the individual goods determined from the goods management data, the graph including multiple curves, each of the curves showing the management of the individual goods over time by one of the participants and each of the curves including multiple data points, each of the data points representing one of the cumulative numbers of the individual goods at one of the points in time, wherein the graph allows a user to select any data point among the data points, and each cumulative number being added up to and including each of the points in time; and
   shifting of a first curve of the graph relative to a second curve of the graph to determine a distance between the first curve and the second curve in response to a user selection of a data point, the shifting ceasing upon a point of the first curve intersecting a point of the second curve, the distance corresponding to the delay time that is attributable to a participant, and the delay time usable to improve an efficiency of the supply chain.

10. The computer-implemented tool of claim 9, further comprising a prediction module that predicts a future management of goods by the participants in the supply chain and updates the display area to show the predicted future management.

11. The computer-implemented tool of claim 9, wherein the computer systems of the participants include software configured to produce a subdivide command to the computer-implemented tool, the subdivide command indicating that additional goods management data being sent to the computer system should be displayed as an additional curve in the display area.

12. The computer-implemented tool of claim 9, further comprising a problem-identifying module that identifies to a user a portion of the display area that meets a predefined criterion for supply chain problems.

13. The computer-implemented tool of claim 12, wherein the predefined criterion is one selected from the group consisting of: a maximum distance between at least two of the curves at a specific time, a maximum distance between at least two of the curves for at least one of the individual goods, and combinations thereof.

14. The computer-implemented tool of claim 9, further comprising an input control for a user to initiate a data cleansing module that rearranges or deletes in the display area at least one of the individual goods that at least one of the participants managed contrary to a goods management procedure.

15. The computer-implemented tool of claim 9, further comprising an input control for a user to select the participants in the supply chain for inclusion in the display area.

16. The computer-implemented tool of claim 9, further comprising an input control for a user to select a category for the individual goods, the input control listing categories from the group consisting of: individual products, individual containers including multiple products, and combinations thereof.

17. A computer program product tangibly embodied in a computer-readable medium, the computer program product including instructions that, when executed, cause a processor to perform operations comprising:
   receiving goods management data in a computer system through a network from computer systems of participants in a supply chain, the goods management data being sent by the computer systems upon the participants managing individual goods at multiple points in time;
   storing the received goods management data in a database;
   adding the stored goods management data together to determine a cumulative number of the individual goods for each of the participants at each of the points in time, the cumulative number being added up to and including each of the points in time;
   generating a graph in the computer system using the cumulative numbers of the individual goods, the graph including multiple curves, each of the curves showing the management of the individual goods over time by one of the participants and each of the curves including multiple data points, each of the data points representing one of the cumulative numbers of the individual goods at one of the points in time;
   while displaying the generated graph to a user, receiving a selection from the user of a data point among the data points in the generated graph; and
   in response to receiving the selection, shifting a first curve of the graph relative to a second curve of the graph to determine a distance between the first curve and the second curve, the shifting ceasing upon a point of the first curve intersecting a point of the second curve, the distance corresponding to the delay time that is attributable to a participant, and the delay time usable to improve an efficiency of the supply chain.

* * * * *